Nov. 15, 1938.  E. PAQUETTE  2,136,864
ICE FISHING APPARATUS
Filed April 13, 1938  2 Sheets-Sheet 1
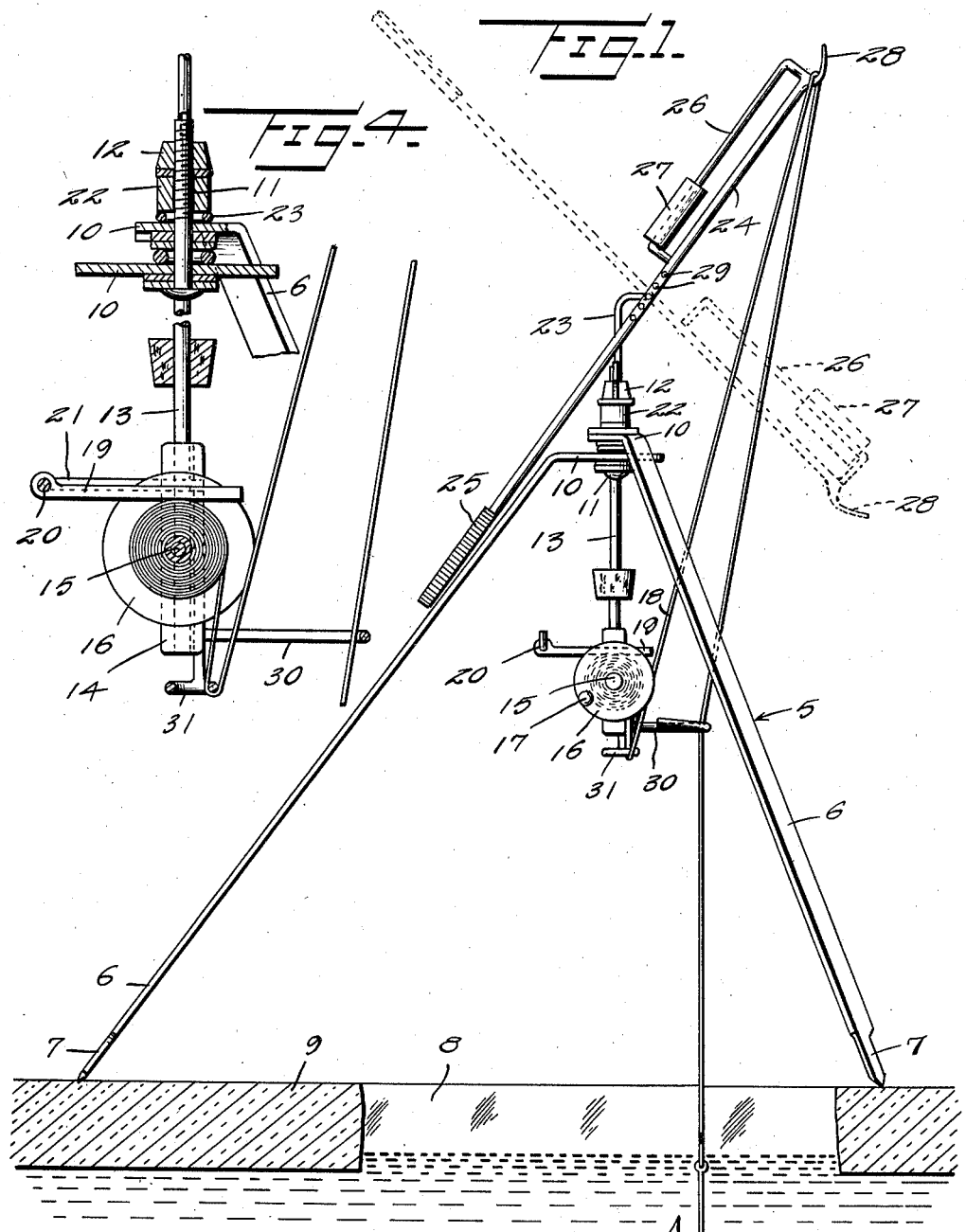
Emile Paquette
INVENTOR
BY Victor J. Evans & Co.
ATTORNEYS

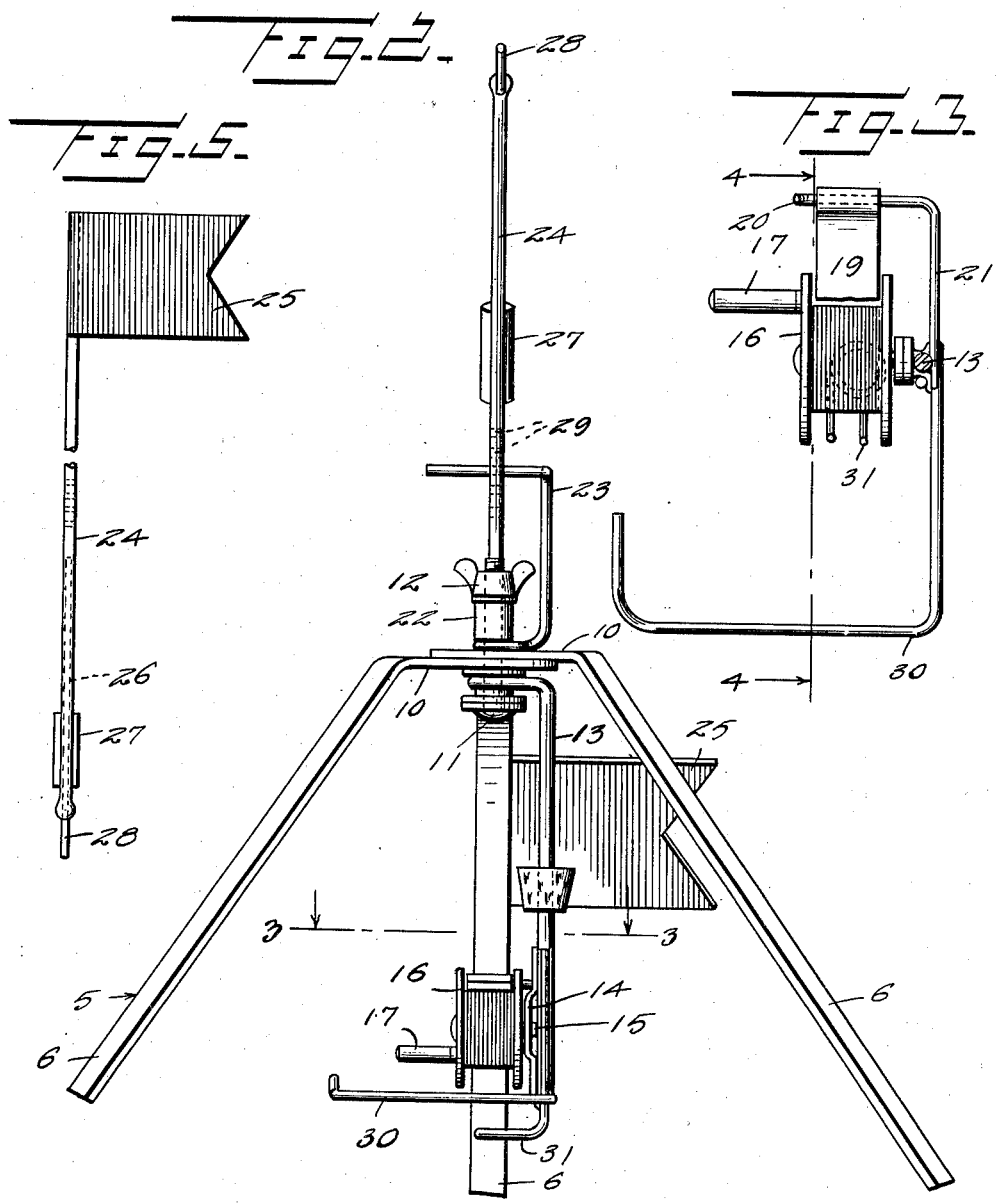

Patented Nov. 15, 1938

2,136,864

UNITED STATES PATENT OFFICE 2,136,864

ICE FISHING APPARATUS

Emile Paquette, Putnam, Conn.

Application April 13, 1938, Serial No. 201,834

2 Claims. (Cl. 43—17)

My invention relates to ice fishing apparatus and more particularly to that type known as tilts.

One of the principal objects of my invention is to provide an ice fishing apparatus equipped with a visual signaling means and which is simple in construction, durable in use, efficient in operation and which lends itself to easy adjustment.

Another object of my invention is to provide an apparatus of the above described character so constructed and arranged as to facilitate certainty and speed of operation and economy in construction.

Other objects and advantages will be apparent from the following description, appended claims and annexed drawings.

Referring to the drawings wherein like reference characters designate like parts throughout the several views:

Figure 1 is a side elevation of my invention illustrating the same arranged over a fishing hole formed in a section of ice.

Figure 2 is a front elevation thereof.

Figure 3 is a sectional view taken on the line 3—3 of Figure 2.

Figure 4 is a sectional view taken on the line 4—4 of Figure 3.

Figure 5 is a detail front elevation of the signaling means or flag.

In practicing my invention I provide a stand 5 of tripod construction equipped with pivoted legs 6, the lower ends of which are fashioned with ice engaging sections 7 whereby to maintain the stand in adjusted position over a fishing hole 8 formed in a section of ice 9 on which the stand is supported. The upper ends of the legs 6 are fashioned with angularly disposed sections 10 pivotally connected together by means of a pivot bolt 11 extending therethrough and equipped with a wing nut 12 whereby the sections are clamped together in adjusted position.

Interposed between the two lowermost sections 10 is a bent portion of a depending reel supporting rod 13, said bent portion being of an eye formation through which the bolt 11 extends. The lower end section of the rod 13 is provided with a bracket 14 having fixed thereon a stub shaft 15 on which is journaled a fishing reel 16 equipped with a handle 17 for rotating said reel. The reel 16 accommodates thereon windings of a fishing line 18 on which rests one end of a brake arm 19. The opposite end of said arm is pivoted as at 20 to a support arm 21 fixed to the rod 13. The weight of the brake arm 19 is sufficient to impart a braking action to the reel through engagement with the windings of line 18 whereby to permit a drag movement of the line by a fish or the like for a purpose hereinafter set forth.

Secured on the bolt 11 between the wing nut 12 and the uppermost section 10 is a spacer or sleeve 22 and interposed between said spacer and said uppermost section is an angularly disposed eyed portion of a vertically extending signaling means supporting arm 23. The upper end of said arm 23 is disposed in a horizontally extending plane and on which is pivotally mounted an arm 24 of a semaphore constituting a visual signaling means. One end of the semaphore arm 24 is equipped with a signal flag 25 and the opposite end of said arm is fashioned with a yoke forming a spaced parallel extending shaft 26 on which is slidably mounted a weight 27. The ends of the shaft 26 are bent for connection with the end of arm 24. The end of the arm 24 adjacent the yoke is fashioned with an extending hook-like section 28 over which is trained the fishing line 18.

Intermediate the length thereof the arm 24 is provided with a plurality of apertures 29 effecting pivot connection with the support arm 23, the horizontally extending section of the arm 23 extending through one of said apertures. Obviously, the arm 24 may be readily detached therefrom for adjusting the same lengthwise relative to said horizontally extending section.

Secured to the lower end of the rod 13 subjacent said reel is a guide member 30 fashioned with a depending section formed with a right angularly disposed eyed end 31 for receiving therethrough the fishing line 18 and said member is also fashioned with a horizontally extending section terminating in an angularly disposed end for maintaining the fishing line in sliding engagement with said member as clearly illustrated in the drawings.

In use, the tripod or stand is disposed above the fishing hole 8 and the end of the fishing line having a hook secured thereto is trained through the eyed section 31 over the hook shaped section 28 of the arm 24 and downwardly against the horizontally extending section of the member 30 and the end of said line disposed below the surface of the water through the opening 8. In this position the semaphore arm is maintained at an angle with the flag engaging one of the legs 6, the weight 27 being disposed at the lower end of the yoke adjacent the support 23. Upon a pull being imparted to the fishing line 18 through the medium of a fish grasping the hook on the end thereof, the yoke end of the arm 24 will be pivoted downwardly as illustrated in dotted lines in Figure 1. The drag on the windings effected by the brake arm 19 is sufficient to actuate the arm 24. As the yoke end of the arm 24 is actuated downwardly the weight 27 slidably gravitates on the arm 26 and serves to accelerate the pivoting movement of the arm 24 and maintain the same in a vertical position with the flag 25 disposed for view above the stand 5 thereby signaling the operator or fisherman that the line 18 has been operated by a fish or the like caught on the hook. As the arm 24 is pivoted the line 18 will be released or slide off of the section 28 and permit the fish to play the line under the ice also permitting rotation of the reel for further unwinding of the line. Secured on the rod 13 is a cork or other suitable means whereby to receive the point of the fishhook when the apparatus is not in use.

From the foregoing it will be apparent that my apparatus provides a simple and efficient device for fishing through the ice whereby the operator or fisherman is quickly notified when a fish is caught on the hook.

What I claim is:

1. In an apparatus of the class described, comprising, a stand adapted to be disposed above a fishing hole formed in a section of ice, a downwardly extending rod supported by said stand, a reel rotatably mounted on said rod and equipped with a fishing line, a support arm carried by said stand and extending thereabove, a semaphore pivoted to said support arm and fashioned with a line engaging section over which said line is adapted to be trained, and a weight slidably mounted on said semaphore for accelerating operation thereof and maintaining the same in signaling position when said semaphore is operated by said line.

2. In an apparatus of the class described, comprising, a stand adapted to be disposed above a fishing hole formed in a section of ice, a downwardly extending rod supported by said stand, a reel rotatably mounted on said rod and equipped with a fishing line, a support arm carried by said stand and extending thereabove, a semaphore pivoted to said support arm and fashioned with a line engaging section over which said line is adapted to be trained, a weight slidably mounted on said semaphore for accelerating operation thereof and maintaining the same in signaling position when said semaphore is operated by said line, and a brake device pivotally mounted on said rod for engagement with said line on said reel for effecting a braking action of said reel to permit said line to operate said semaphore.

EMILE PAQUETTE.